(12) United States Patent
Sullivan et al.

(10) Patent No.: US 6,183,681 B1
(45) Date of Patent: Feb. 6, 2001

(54) MULTI-STAGE INSERT MOLDING METHOD

(75) Inventors: Jonathan L. Sullivan; Douglas McKeown, both of Lincoln, NE (US)

(73) Assignee: Centurion International, Inc., Lincoln, NE (US)

(*) Notice: Under 35 U.S.C. 154(b), the term of this patent shall be extended for 0 days.

(21) Appl. No.: 09/206,139

(22) Filed: Dec. 7, 1998

(51) Int. Cl.[7] .................................................. B29C 39/12
(52) U.S. Cl. .................. 264/245; 264/246; 264/247; 264/254; 264/255; 264/271.1; 264/275; 264/279; 264/279.1; 264/294; 264/296; 264/328.7; 264/328.8
(58) Field of Search ..................................... 264/254, 255, 264/259, 275, 279, 328.8, 294, 296, 279.1, 245, 328.7, 271.1, 246, 247

(56) References Cited

U.S. PATENT DOCUMENTS

| | | | |
|---|---|---|---|
| 2,940,128 | * 6/1960 | Bowerman et al. | 264/254 |
| 5,053,178 | * 10/1991 | Butlin et al. | 264/254 |
| 5,215,341 | * 6/1993 | Namakura et al. | 285/423 |
| 5,376,325 | * 12/1994 | Ormson | 264/254 |
| 5,714,104 | * 2/1998 | Bailey et al. | 264/254 |

* cited by examiner

*Primary Examiner*—Leo B. Tentoni
*Assistant Examiner*—Suzanne E. McDowell
(74) *Attorney, Agent, or Firm*—Zarley, McKee, Thomte, Voorhees & Sease; Dennis L. Thomte

(57) ABSTRACT

A multi-stage method of insert molding is described including the steps of: providing a vertically movable first mold member with a cavity formed therein; providing a second mold member having a substantially flat upper molding surface; providing a third mold member having an upper end with a cavity formed therein; positioning an insert directly on the flat upper molding surface of the second mold member; positioning the first mold member with respect to the second mold member so that the cavity of the first mold member receives the insert; injecting a first flowable plastic material into the cavity in the first mold member to partially encapsulate the insert; allowing the first flowable plastic material to cool and solidify, thereby creating a first stage molding; removing the first mold member and the second stage molding from the second mold member; positioning the first mold member with respect to the third mold member so that the first stage molding registers with the cavity of the third mold member; injecting a second flowable plastic material into the cavity of the third mold member; allowing the second plastic material to cool and solidify to form a second stage molding; and ejecting the second stage molding from the cavities in the first and third mold members.

4 Claims, 3 Drawing Sheets

MULTI-STAGE INSERT MOLDING METHOD

BACKGROUND OF THE INVENTION

1. Field of the Invention

The present invention relates to a method of insert molding and more particularly to a method of molding an insert or inserts in position during the molding process.

2. Description of the Related Art

Insert injection molding is a manufacturing process that is used in a variety of different industries and products. The definition of insert molding is commonly understood to be placing an object in an injection molding tool with plastic material being injected around the inserted component to either partially or totally encapsulate the inserted component.

Injection molding is used for a variety of reasons. It may be used to reduce the number of parts in the assembly by using the injected molded plastic to mechanically hold the assembly together. It may also be used to reduce wall thickness in some applications by eliminating the need for additional walls of metal or plastic for structural strength. Injection molding may simply be used to create a stronger, more robust assembly by joining the assembly together without the use of adhesive or other less reliable fastening techniques.

However, there are several limitations to conventional insert molding. The object that is to be insert molded must be held in place in the injection molding tooling during the extreme heat and pressure of the injection molding cycle. This sometimes is difficult unless the part is shaped a certain way with special features to hold and position it correctly. Using conventional methods, this is accomplished by the use of an insert holding device, sometimes referred to as a mandrel. Using conventional methods, the object to be encapsulated is attached to the mandrel and then both objects are placed into the injection molding tool during the injection molding cycle. When the cycle is complete and the plastic has had time to solidify, the mandrel is removed from the molded assembly. This procedure is cumbersome and timeconsuming. Also, after the mandrel has been removed, the hole which was occupied by the mandrel must be filled. This hole must be filled for mechanical, aesthetic, electrical or environmental reasons.

Another limitation of conventional insert molding techniques is the difficulty of protecting the inserted part from damage or deformation during the extreme temperature and pressure of injection molding inasmuch as internal cavity pressures sometimes exceed 10,000 psi and temperatures in excess of 600° F.

SUMMARY OF THE INVENTION

The invention disclosed herein relates to a method of insert molding and more particularly relates to a method of holding a component part in the cavity section of an injection mold tooling while hot plastic is being inserted into the cavity and the part is being encapsulated thereby. The instant invention makes it possible to insert mold a large variety of shapes and sizes of inserted components. Additionally, the invention makes it possible to insert mold a variety of materials without deforming or damaging the inserted parts. Further, the invention eliminates the use of mandrels and other insert positioning and holding devices. The mandrels and other holding devices are not necessary, which means that the inserted component will be totally encapsulated to eliminate unsightly and unnecessary holes and openings in the molded assembly. The instant invention makes it possible to insert mold a multiple of parts at one time.

These and other objects will be apparent to those skilled in the art.

DESCRIPTION OF THE PREFERRED EMBODIMENT

Figure 1:
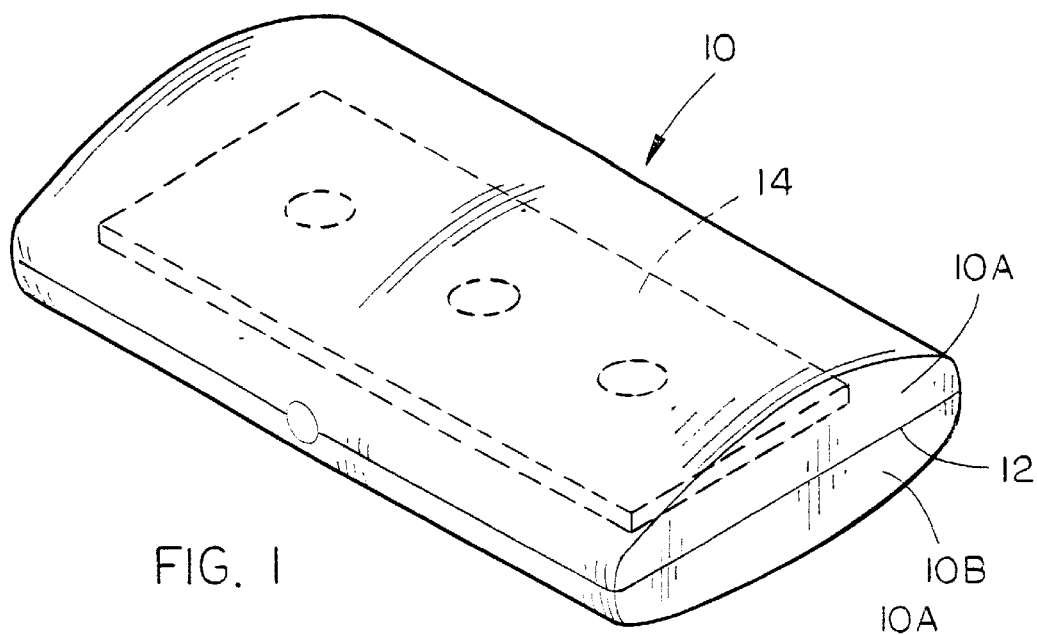
FIG. 1 is an asymmetric view of the molded assembly after the part has been ejected from the injection molding tooling.
Figure 2:
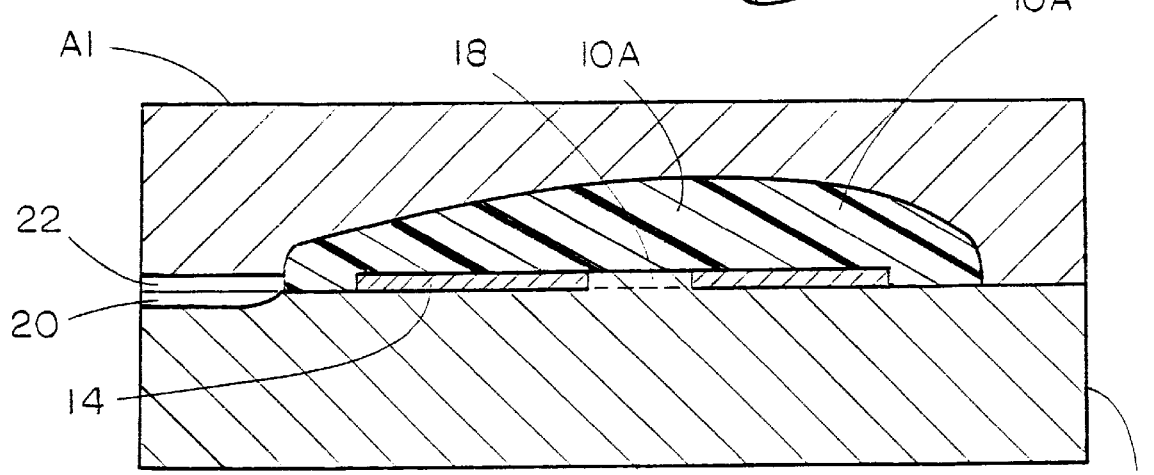
FIG. 2 is a sectional view illustrating the insert positioned on a lower cavity with an upper cavity having been positioned thereover and plastic injected around the upper portion of the insert.
Figure 3:
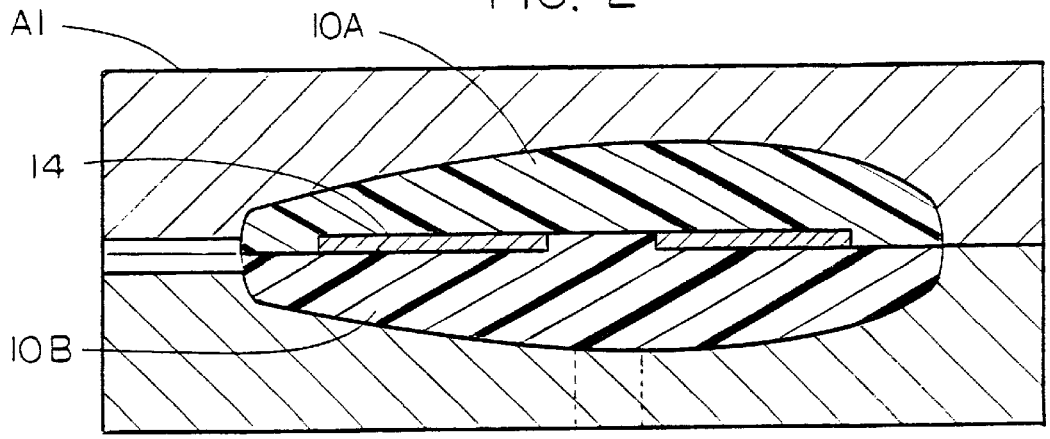
FIG. 3 is a view similar to FIG. 2 except that the upper cavity and the partially encapsulated insert have been positioned over a second lower cavity with plastic having been injected therein to totally encapsulate the insert.
Figure 4:
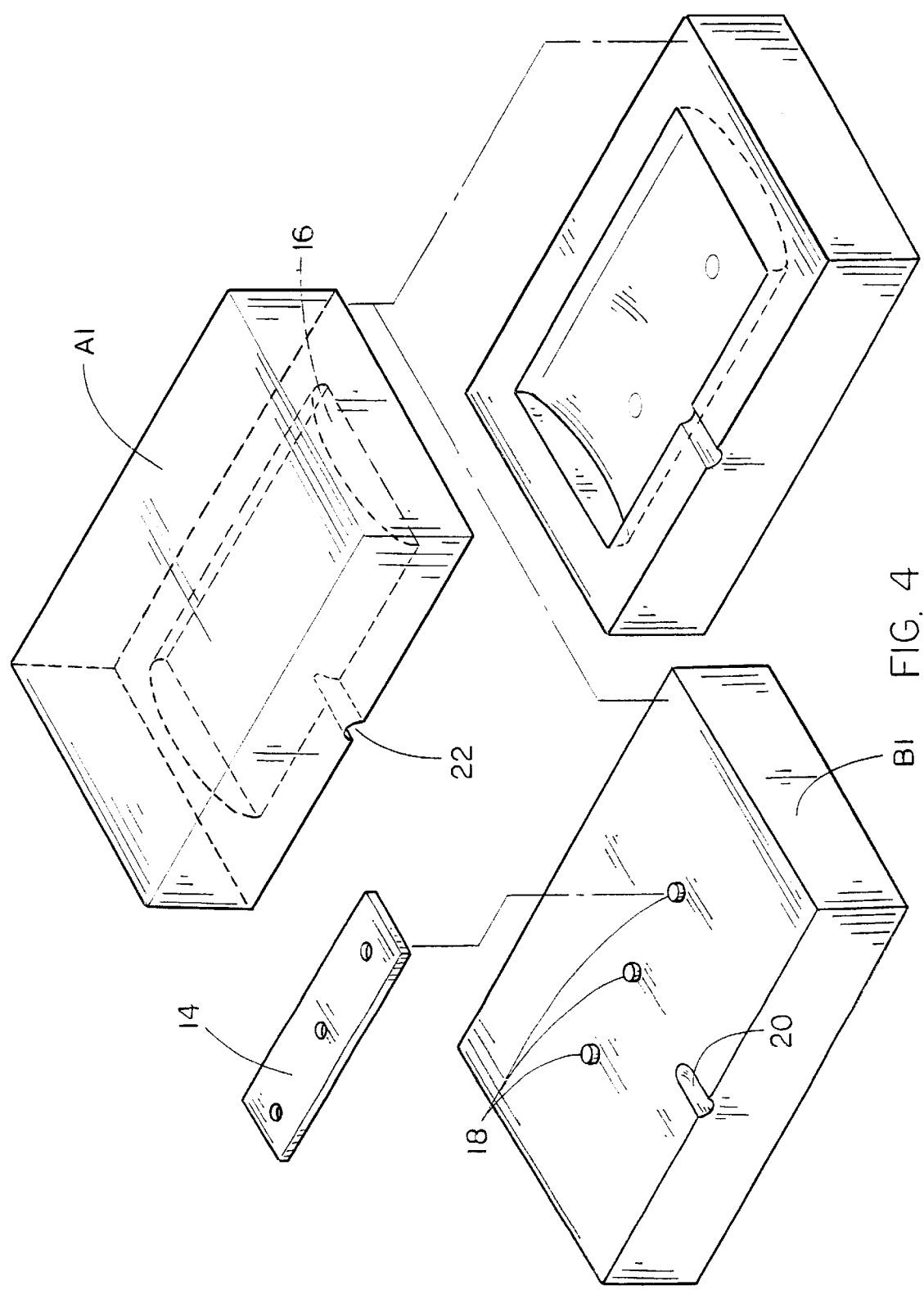
FIG. 4 is an exploded perspective view of the components utilized in the method of this invention.

In FIG. 1, the numeral 10 refers to an example of a molded assembly that is produced using the multi-stage insert molding technique of this invention. FIG. 1 illustrates one of many applications that could be molded using the technique of this invention. FIG. 1 illustrates the two halves 10A and 10B divided by the parting line 12. The separated halves 10A and 10B could be molded from different materials and/or colors. An inserted component 14 may or may not be molded within the two halves 10A and 10B.

Figure 5:
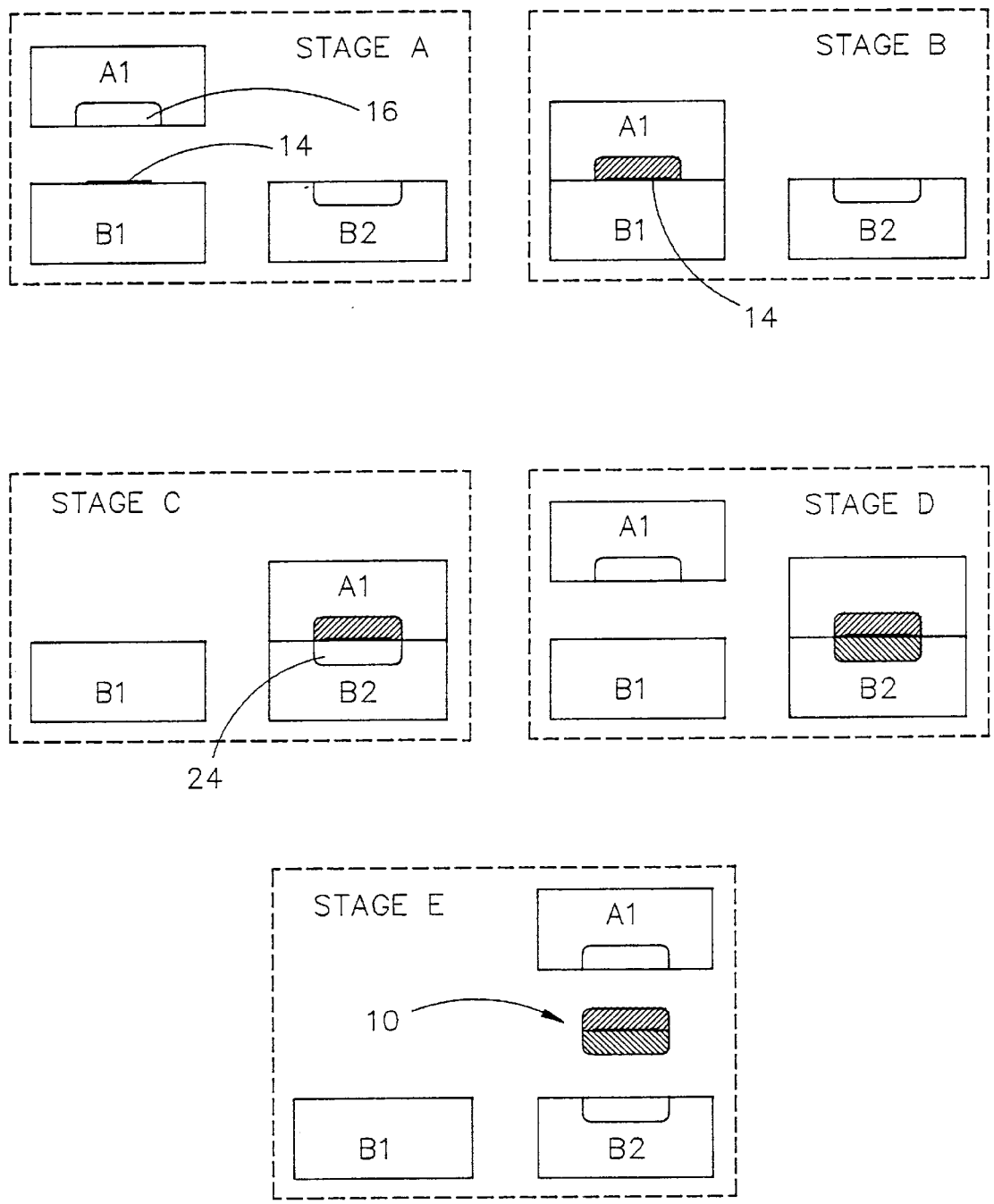
FIG. 5 is a schematic view of the method of this invention.

FIG. 5 illustrates the sequence or multi-stage insert process of this invention. In stage A, cavity A1 including a cavity 16 is raised over cavity B1. The inserted component part 14 is placed onto location pins 18 in cavity B1. The inserted component part 14 may be held in place by devices other than pins. Locating features built into the tooling, blades, raised edges or other devices, are commonly used as locating devices and could be used rather than the locating pins 18. In some cases, no locating features are necessary to hold the inserted component part in place.

The component 14 may be inserted into the tooling manually by the machine operator or automatically by a robot. The inserted components may be fed into the injection mold tooling by a reel-to-reel design. After the part 14 has been loaded, the injection mold tooling is closed. The injection mold tooling or machine lowers mold cavity A1 vertically onto cavity B1 and is held there under extreme force.

Stage B illustrates the first molding stage of the process. Heated plastic from the injection molding machine is injected into the mold cavity 16 via runners 20 and 22 and gates (not shown). During this injection cycle, the cavity 16 is filled and the inserted component part 14 is sandwiched between the cavity steel of cavity B1 and the plastic flow of the first stage molding. Plastic is forced around the inserted component part 14 to form the first stage molding, as illustrated in stage B of FIG. 5. The mold is cooled to permit the plastic to solidify. The molding machine clamping mechanism opens the injection molding tooling and cavity A1 is lifted vertically from cavity B1.

Stage C of FIG. 5 illustrates the transfer stage. Because of the holding features built into the cavity A1, the first stage molding of stage B is held in the cavity A1 when the mold is open. The shuttle or rotary table mechanism that is built into the molding machine transfers the cavity A1 horizontally to a position directly above cavity B2, as illustrated in stage C of FIG. 5. Cavity B2 is provided with a cavity 24. The mold cavity A1 is vertically closed upon cavity B2 and extreme force holds the two cavity halves together.

Stage D of FIG. 5 is the second stage molding. Heated plastic from the molding machine is injected into the cavity 24 of cavity B2 through the cavity runner/gate to form the second stage molding. The inserted component part 14 is sandwiched between the previously molded first stage molding and the plastic flow of the second stage molding. The cavity is held under pressure until the plastic has cooled. The tooling is opened again by cavity A1 vertically lifting from cavity B2.

Stage E of FIG. 5 is the ejection stage. The final molded assembly 10 is ejected from the tooling by means of ejection sleeves or pins and the process is complete.

Thus it can be seen that a novel multi-stage insert molding method has been described which holds a component part in the cavity section of an injection mold tooling while hot plastic is being injected into the cavity and the part is being encapsulated thereby. The instant invention makes it possible to insert mold a large variety of shapes and sizes of inserted components and makes it possible to insert mold a variety of materials without deforming or damaging the inserted parts. The method of this invention eliminates the use of mandrels and other insert positioning and holding devices which means that the inserted component will be totally encapsulated to eliminate unsightly and unnecessary holes and openings in the molded assembly.

Thus it can be seen that the invention accomplishes at least all of its stated objectives.

We claim:

1. A multistage method of insert molding, comprising the steps of:

providing a vertically moveable first mold member having a lower end with a cavity formed therein;

providing a second mold member having a substantially flat upper molding surface;

providing a third mold member having an upper end with a cavity formed therein;

positioning an insert directly on said flat upper molding surface of said second mold member;

positioning said first mold member with respect to said second mold member so that said cavity of said first mold member receives said insert;

injecting a first flowable plastic material into said cavity in said first mold member to partially encapsulate said insert;

allowing the first flowable plastic material to cool and solidify, thereby creating a first stage molding with said insert partially encapsulated therein;

removing said first mold member and said first stage molding with said insert partially encapsulated therein from said second mold member;

positioning said first mold member with respect to said third mold member so that said first stage molding with said insert partially encapsulated therein registers with said cavity in said third mold member;

injecting a second flowable plastic material into said cavity in said third mold member;

allowing the second flowable plastic material to cool and solidify to form a second stage molding wherein said insert is sandwiched between said first stage molding and said second stage molding and is completely embedded therebetween;

and ejecting said (second stage molding) completely embedded insert from said cavities in said first and third mold members.

2. The method of claim 1 wherein the insert is held in place on said flat surface of said second mold member by locating means.

3. The method of claim 1 wherein said first and second plastic materials are of different colors.

4. The method of claim 1 wherein said first and second plastic materials have different compositions.

* * * * *